(No Model.) 4 Sheets—Sheet 1.
R. N. BAYLES.
COMMUTATOR BRUSH HOLDER.
No. 504,901. Patented Sept. 12, 1893.
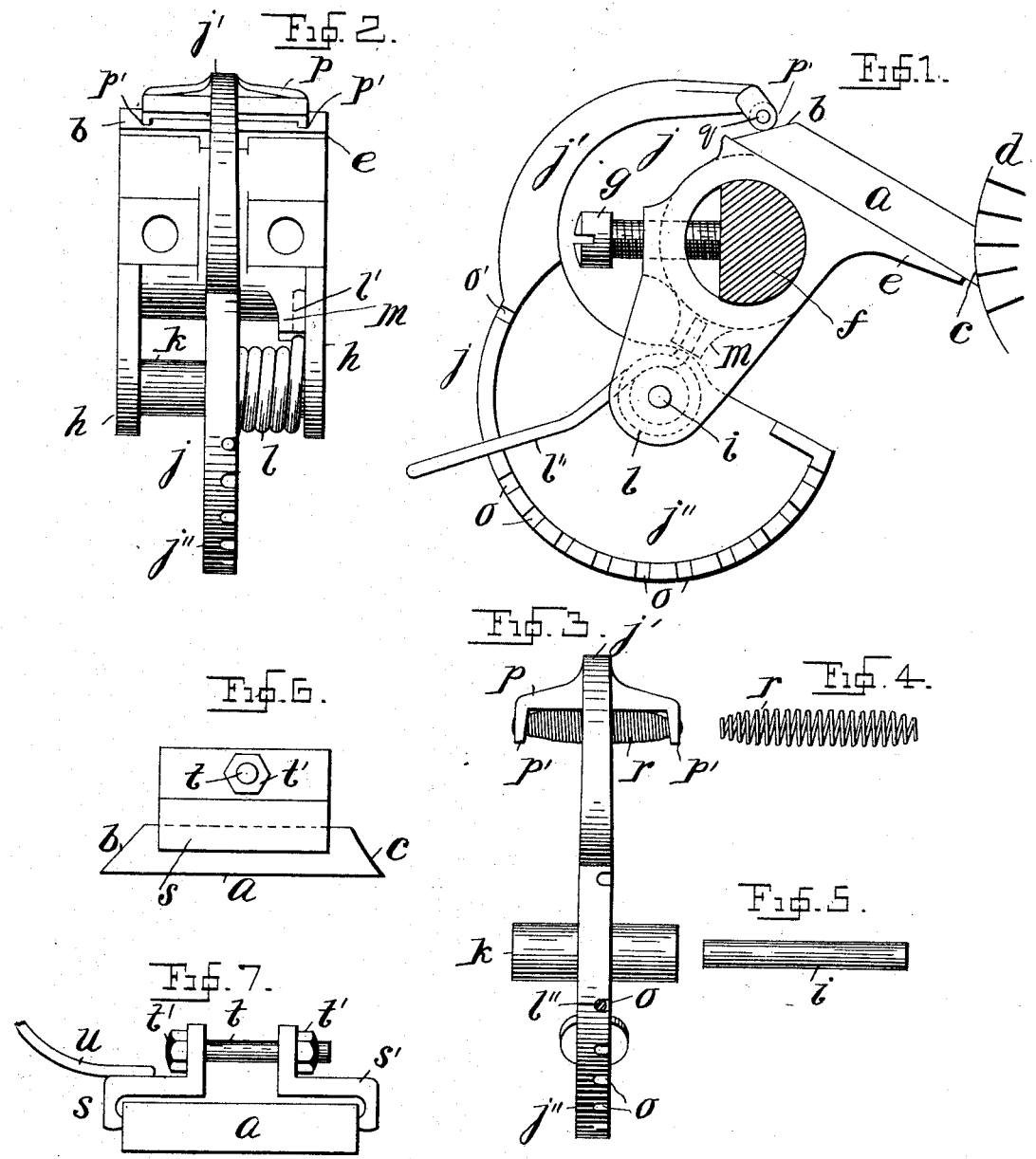
Witnesses
Wm H Courtland
Leocadia M Lennan
Inventor
Robert N. Bayles
By his Attorney,
Edward P. Thompson (No Model.) 4 Sheets—Sheet 2.
R. N. BAYLES.
COMMUTATOR BRUSH HOLDER.
No. 504,901. Patented Sept. 12, 1893.
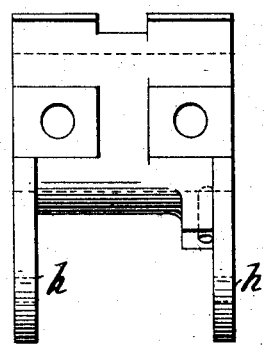
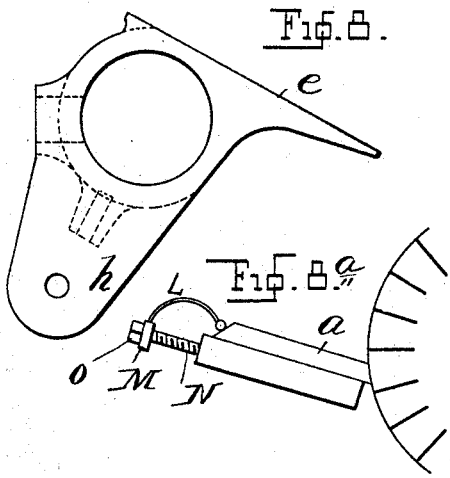
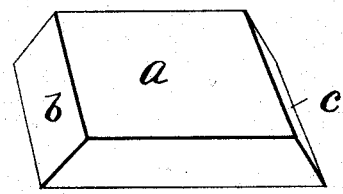
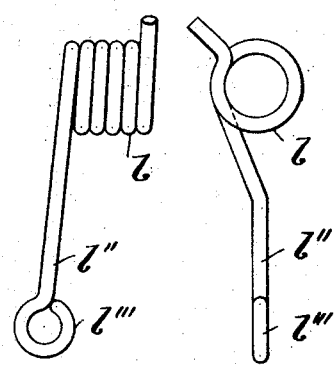
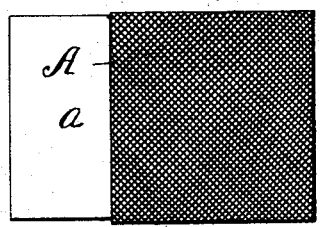
Witnesses
Wm H Courtland
Leocadia M Lennan
Inventor
Robert N. Bayles,
By his Attorney,
Edward P. Thompson (No Model.) 4 Sheets—Sheet 3.
R. N. BAYLES.
COMMUTATOR BRUSH HOLDER.
No. 504,901. Patented Sept. 12, 1893.
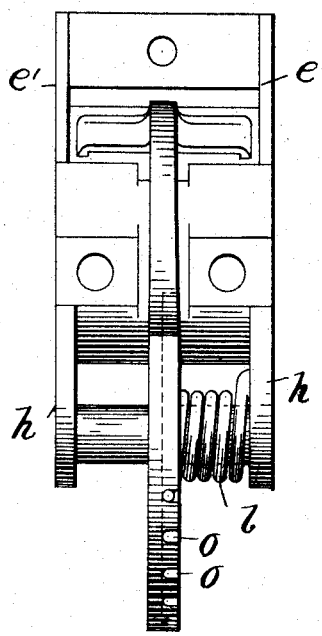
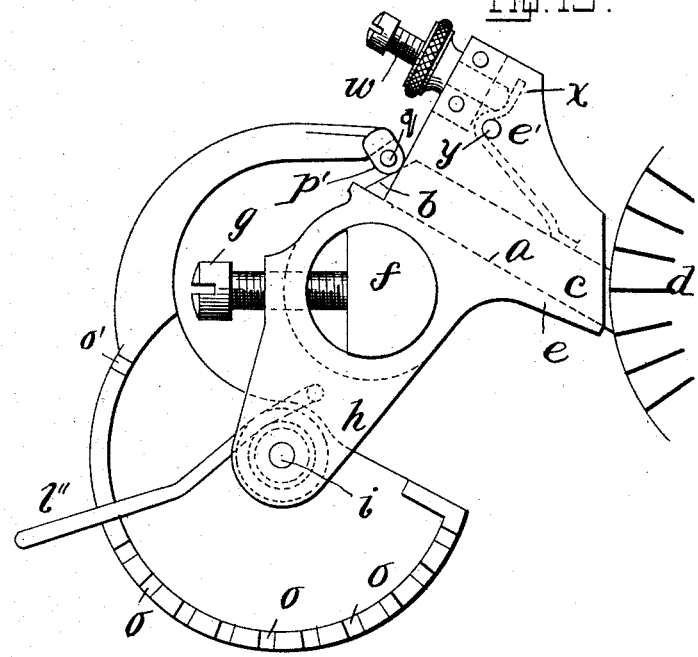
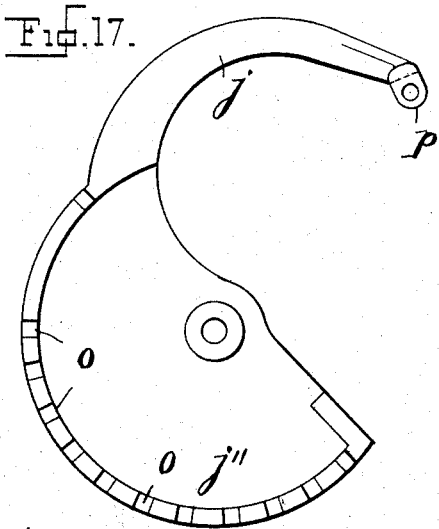
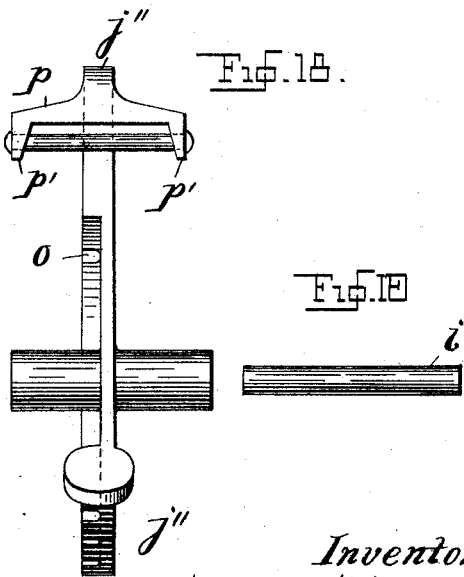
Witnesses
Wm H. Courtland
Leocadia M. Lennan
Inventor
Robert N. Bayles,
By his Attorney,
Edward P. Thompson (No Model.)
R. N. BAYLES.
COMMUTATOR BRUSH HOLDER.
No. 504,901. Patented Sept. 12, 1893.
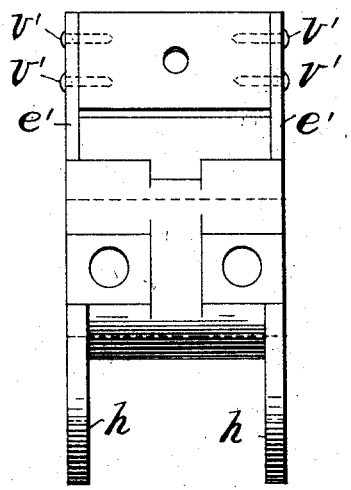
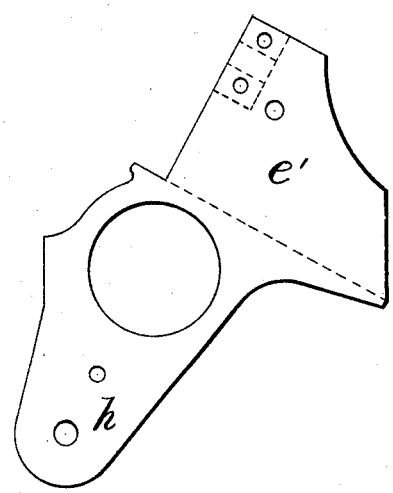
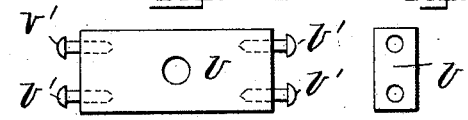
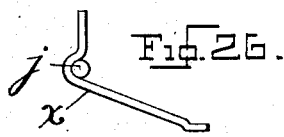
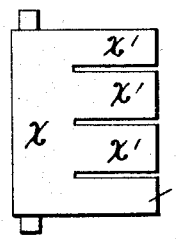
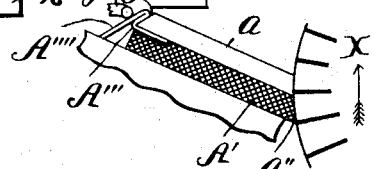

UNITED STATES PATENT OFFICE.

ROBERT N. BAYLES, OF NEW YORK, N. Y.

COMMUTATOR-BRUSH HOLDER.

SPECIFICATION forming part of Letters Patent No. 504,901, dated September 12, 1893.

Application filed March 30, 1893. Serial No. 468,273. (No model.)

*To all whom it may concern:*

Be it known that I, ROBERT N. BAYLES, a citizen of the United States of America, residing at New York, in the county and State of New York, have invented certain new and useful Improvements in Commutator-Brush Holders, (Case No. 2,) of which the following is a specification.

In the construction of dynamos and electric motors, it is desirable to employ carbon as the brush, but difficulties have been encountered, rendering it objectionable.

The object of my invention is to construct a brush, holder for carbon, or any non-metallic electric conductors, and at the same time operative with a metallic electric conductor.

The invention is illustrated by the accompanying drawings.

Figure 1 is a side elevation, partly in section, and partly dotted, of the complete device. Fig. 2 is a front elevation of the same device. Fig. 3 is a similar view of a portion of that in Fig. 2. Fig. 4 shows the helical spring contact by itself. Fig. 5 is a view of the pin forming the fulcrum of the lever shown in Figs. 2 and 3. Figs. 6 and 7 are side and end elevations of a modification showing a grip binding screw. Figs. 8 and 9 are respectively side and front elevations of the adjustable support for the carbon block or brush, with its separable parts removed. Fig. 8ª is a modification. Fig. 10 is a perspective of the carbon block. Figs. 11 and 12 are different views of said block equipped with metallic gauze. Figs. 13 and 14 show by themselves, rectangular views of the spring seen partly in Figs. 1 and 2. Figs. 15 and 16 are respectively side and front elevations of a modified construction, of the complete device. Fig. 17 is a side elevation of the pivoted lever by itself, being separable from the device. Fig. 18 is a rear elevation of the same. The helical spring is omitted in both. Fig. 19 shows the arbor by itself upon which turns the element shown in Figs. 17 and 18 by itself. Figs. 20 and 21 are side and rear elevations of the adjustable carbon holder equipped with a modification. Figs. 22, 23, 24, 25, 26 and 27 are different views of details partly seen in Figs. 15 and 16. Figs. 28 and 29 are different views of the retractile spring used in the construction seen in Figs. 15 and 16. Fig. 30 is a section of a modified brush or compound block applied to the holder, and Fig. 30ª is the compound block in section.

The device embodied in my invention consists of the combination of a block $a$ of electrical conducting material such as carbon or copper, having opposite ends, &c., beveled toward each other, the one end being in contact with the commutator $d$; a brush holder having a flat surface upon which said block rests and is slidable, the plate being at such an angle to the commutator that the lower end of the said block is at or below a plane including the axis of the commutator and the other end is above that plane, and so that the lower beveled edge is in contact with the commutator; a stationary supporting pin or bar $f$, upon which the holder is attached by set screws $g$; lugs $h$ depending from said holder and connected by an arbor $i$ which acts as a fulcrum for a lever $j$ or follower having arms $j'$ and $j''$; a journal bearing $k$ for the lever $j$ extending from lug to lug, and surrounding the said arbor; a pressure spring $l$ having one end $l'$ extending into and fixed in a lug $m$ upon the brush holder, and the other end $l''$ extending radially from said arbor $i$ and held in one or the other of the notches $o$ which are provided for the purpose in the lever arm $j'''$, the spring $l$ being coiled in such a direction that the arm $j'$ is pressed toward the commutator $d$; a fork $p$ having tines $p'$, carried on the the arm $j'$, the tines forming bearings for a pin $q$ which passes through and holds a helical electric conducting spring $r$ of uniform diameter except at the ends which taper to the size of said pin to form bearings, the said spring pressing upon the beveled edge $b$ of the block $a$, in such a manner that the several central convolutions are in contact with the said block; and other details as described below. The arm $j'$ is curved circularly to allow its movement toward the commutator without meeting the holder $e$. The arm $j''$ is in the form of a semi-circular disk with a flanged rim in which are the notches $o$. The notch $o'$ is more distant than the others are from one another, and serves to hold the arm $j'$ away while the block $a$ is being changed.

The electric current can pass with little resistance from the spring $r$ and from the holder $e$ to the block $a$ and the carbon becomes only slightly warm; but if greater contact is desired the grip shown in Figs. 6 and 7 may be used. It consists of two jaws $s\ s'$ touching the block $a$ and clamped together by bolt $t$ and nuts $t'$.

$u$ is a flexible electric conductor united to one of the jaws.

It is found in practice that the block $a$ does not slip laterally, nor spring upward as has been predicted wrongly by critics, but to show that the invention has its modifications in this direction, the details shown in Figs. 15, 16, 20, 21, 22, 23, 24, 25, 26 and 27 are described thus: The sides of the holder $e$ are provided with guides $e'$, between which the block $a$ may slide lengthwise. These guides prevent the block $a$ from moving sidewise. The guides $e'$ are connected by a threaded brace $v$ fastened to the guides by screws $v'$, and carrying an adjustable screw $w$ which presses against a bent spring $x$ whose opposite end presses upon the block $a$ with a pressure dependent upon the tension produced by said screw $w$. The milled nut $w'$ fixes the screw $w$ in any given position. This spring is forked, having tines $x'$ as seen in Fig. 27 so that good contact with the block $a$ is insured. The pin $y$ acts as the fulcrum for the bent spring $x$, so that when the screw $w$ tightens, the spring $x$ is forced downward upon the contact block $a$, which at the same time may be fed forward by the arm $j'$.

The spring $l$ in Figs. 1, 2, 13 and 14 has both ends substantially radial, the shorter end being fixed in the lug $m$. In Figs. 15, 16, 28 and 29, the shorter end is bent and is fixed into one of the lugs $h$, which latter construction does away with the necessity of the lug $m$. It is well to coil the longer end to form a handle $l'''$.

For the purpose of reducing the electrical resistance to a minimum I propose a metal gauze $A$ applied to the block $a$ and turned up around the edges, and located between and touching the holder $e$ and the block $a$.

The operation is best described by stating just how the device should be used in practice.

These brush holders are designed to be used on the same brush pin $f$ as the regular copper brush-holders. The pin should stand as shown, with its flat side square, with a line through centers of commutator $d$ and pin. Place the holder $e$ on the pin, observing the position shown in the figure relative to the direction of rotation. Tighten the set screws $g$ (gently, moving the commutator edge of the holder slightly up and down, so as to allow the set screw $g$ to find its true seat), to give the brushes their proper alignment. The brush pin $f$ should be so adjusted that the edge of holder $e$ shall be about one-sixteenth of an inch from commutator. Where practicable, the brushes on the opposite sides of the commutator should be "staggered," so that they will not follow in direct line. To so set them most effectively, proceed as follows:

Place the brush in the position shown. Insert a strip of coarse sand-paper between the end of the block $a$ and the commutator $d$, with sand side toward the block. Apply a strong pressure by means of the pressure spring $l$, and draw the sand paper back and forth, keeping it pulled close against the commutator, until the block has become shaped to the commutator surface over its entire end. On removing the sand-paper, take the block out, blow all dust away and wipe off the end of the carbon to remove all particles of sand. The block is now ready to run. When running, the pressure, which can be adjusted to any amount desirable, by the pressure spring $l$, should be only sufficient to give the block $a$ a firm and positive contact against the commutator. Too great a pressure will cause undue heating.

In Figs. 30 and 30$^a$ a gauze mass lies between the carbon contact $a$ and plate $e$. The said mass is composed by convolutions $A'$ of wire gauze around a core of woven wire $A''$. Fastened to the gauze mass is an electric conducting plate $A'''$ bent so as to have the flat plate $A''''$ oblique to the plate $e$ so as to correspond to the beveled edge $b$ on the block $a$. The arrow X shows the direction of rotation of the commutator. Both the metallic gauze mass and carbon block $a$ are in contact with the commutator. The lower edge of the carbon block prevents the upper edge of the gauze mass from fraying. It also forms a resistance, thereby serving to cut out commutator segments gradually, and reduce injury by sparking. The lower edge of the gauze mass at $a''$ is trimmed off to prevent the same from catching in any unevenness in the commutator. The carbon block is useful further in lubricating the commutator.

In Fig. 8$^a$ the brush or block $a$ is pressed upon the plate $e$ and against the spring L which is held by a ring M slidable along the screw N projecting from the plate $e$. A nut O is upon the screw N and is for the purpose of feeding the block $a$ from time to time.

I claim as my invention—

1. The combination with a commutator, of a block of carbon or other electric conductor having opposite ends beveled toward each other, and one of the beveled ends lying against said commutator, a flat and adjustable conducting plate upon which the block rests and upon which it is movable, a helical spring bearing against the remaining beveled end, and movable toward the commutator, and means for varying the pressure of said helical spring upon said block.

2. The combination with a commutator, of a block of carbon or other electric conductor having opposite ends beveled toward each other, and one of the beveled ends lying against said commutator, a flat and adjustable conducting plate upon which the block rests and upon which it is movable, a helical spring bearing against the remaining beveled end, and movable toward the commutator, and means for varying the pressure of said helical spring upon said block, said means consisting of a second spring one end of which is fixed, and the other end of which is adjustable to predetermined fixed positions upon the holder of said helical spring.

3. The combination with a commutator, of an electric conducting block pressing thereon, a holder therefor, circularly adjustable around a given arbor, the block being movable in the holder, an arm provided with notches bearing against the block toward the commutator, and circularly adjustable around a second arbor, means for maintaining the holder fixed, and a spring having one end held fixed, and the other adjustable for insertion into any of said notches.

4. The combination with a commutator, and adjustable spring of an electrical conducting block in contact therewith and movable on and in contact with a flat conducting plate, one end of the block being in contact with the commutator at or below a plane including the axis of the commutator, and the other end being above said plane and beveled toward the commutator, and a pivoted arm whose one end presses the block toward the commutator and whose other end is connected to said adjustable spring.

5. The combination with a commutator, and adjustable spring of an electrical conducting block in contact therewith and movable on and in contact with a flat conducting plate, one end of the block being in contact with the commutator at or below a plane including the axis of the commutator, and the other end being above said plane and beveled toward the commutator, and a pivoted arm whose one end presses the block toward the commutator and whose other end is connected to said adjustable spring, and a helical conductor connected to said conducting block.

6. The combination with a commutator, of an electrical conducting block in contact therewith and movable on and in contact with a flat conducting plate, one end of the block being in contact with the commutator at or below a plane including the axis of the commutator, and the other end being above said plane and beveled toward the commutator, and a pivoted arm carrying a helical spring whose convolutions press upon said block toward the commutator.

7. A commutator brush consisting of an electric conducting block, whose opposite ends are beveled toward each other.

8. The combination with a commutator of a conducting block in contact therewith, an adjustable flat plate upon which the block rests, and means for pressing the block against the commutator, said means consisting of a movable helical spring whose convolutions bear upon the end of said block.

9. The combination of a commutator, an electric conducting block in contact therewith, a plate supporting said block, and a follower pressing the said block toward said commutator and against said plate.

10. The combination of a commutator, an electric conducting block in contact therewith, a plate supporting said block, and a follower pressing the said block toward said commutator and against said plate, one end of the block being at or below the plane including the commutator's axis and the other end being above said plane.

11. The combination with a commutator and a conducting block bearing thereon of a follower for the block carrying a helical spring whose convolutions bear upon said block.

In testimony that I claim the foregoing as my invention I have signed my name, in presence of two witnesses, this 20th day of March, 1893.

ROBERT N. BAYLES.

Witnesses:
EDWARD P. THOMPSON,
E. G. DUVALL, Jr.